(12) United States Patent
Ramaswamy

(10) Patent No.: US 7,783,710 B2
(45) Date of Patent: Aug. 24, 2010

(54) SYSTEMS AND METHODS FOR SPREADING MESSAGES ONLINE

(75) Inventor: Venkat Ramaswamy, 700 Highland Ave., Falls Church, VA (US) 22046

(73) Assignee: Venkat Ramaswamy, Falls Church, VA (US)

( * ) Notice: Subject to any disclaimer, the term of this patent is extended or adjusted under 35 U.S.C. 154(b) by 708 days.

(21) Appl. No.: 11/419,500

(22) Filed: May 21, 2006

(65) Prior Publication Data

US 2007/0271336 A1     Nov. 22, 2007

(51) Int. Cl.
*G06F 15/16*      (2006.01)
*G06F 15/173*    (2006.01)
*H04W 4/00*      (2009.01)

(52) U.S. Cl. ................ 709/206; 709/223; 709/204; 455/466

(58) Field of Classification Search ............. 709/206
See application file for complete search history.

(56) References Cited

U.S. PATENT DOCUMENTS

| | | | |
|---|---|---|---|
| 5,454,213 A * | 10/1995 | Gola | 53/474 |
| 5,636,292 A * | 6/1997 | Rhoads | 382/232 |
| 5,793,497 A * | 8/1998 | Funk | 358/402 |
| 5,913,212 A * | 6/1999 | Sutcliffe et al. | 707/6 |
| 5,941,947 A * | 8/1999 | Brown et al. | 709/225 |
| 6,209,100 B1 * | 3/2001 | Robertson et al. | 726/2 |
| 6,279,124 B1 * | 8/2001 | Brouwer et al. | 714/38 |
| 6,345,288 B1 * | 2/2002 | Reed et al. | 709/201 |
| 6,549,957 B1 * | 4/2003 | Hanson et al. | 710/5 |
| 6,748,422 B2 * | 6/2004 | Morin et al. | 709/206 |
| 6,779,022 B1 * | 8/2004 | Horstmann et al. | 709/206 |
| 6,865,715 B2 * | 3/2005 | Uchino et al. | 715/277 |
| 6,952,406 B2 * | 10/2005 | Procopio | 370/252 |
| 6,980,983 B2 * | 12/2005 | Banerjee et al. | 707/3 |
| 7,013,290 B2 * | 3/2006 | Ananian | 705/27 |
| 7,027,463 B2 * | 4/2006 | Mathew et al. | 370/463 |
| 7,028,001 B1 * | 4/2006 | Muthuswamy et al. | 705/14.73 |
| 7,130,807 B1 * | 10/2006 | Mikurak | 705/7 |
| 7,188,153 B2 * | 3/2007 | Lunt et al. | 709/218 |
| 7,218,921 B2 * | 5/2007 | Mendiola et al. | 455/414.1 |
| 7,305,436 B2 * | 12/2007 | Willis | 709/204 |
| 7,310,676 B2 * | 12/2007 | Bourne | 709/227 |
| 7,386,517 B1 * | 6/2008 | Donner | 705/75 |
| 7,437,429 B2 * | 10/2008 | Pardikar et al. | 709/219 |
| 7,472,110 B2 * | 12/2008 | Achlioptas | 707/3 |

(Continued)

OTHER PUBLICATIONS

YouTube Webpage,"Money, get a way", p. 1, Apr. 30, 2006, http://web.archive.org/web/20060430062911/youtube.com/watch?v=EiBBudoC5iQ.*

(Continued)

*Primary Examiner*—Aaron Strange
*Assistant Examiner*—James Edwards
(74) *Attorney, Agent, or Firm*—John Curtin; Cappat.com

(57) ABSTRACT

This invention consists of a restricted online social network system that does not expose one member's friends to other members and a method of spreading a message in the system by members asking the system to show the message to their friends, recursively. The system records each member's actions on a message and reports the message's overall reach, acceptance and effectiveness through various metrics. Further, when a viewer submits a form embedded in the message, the system can fulfill an online transaction or send an online communication. Also, the system integrates with internet search engines and online advertisement vendors to promote the message on the internet.

32 Claims, 5 Drawing Sheets

U.S. PATENT DOCUMENTS

| | | | | |
|---|---|---|---|---|
| 2004/0148503 A1* | 7/2004 | Sidman | | 713/167 |
| 2005/0120084 A1* | 6/2005 | Hu et al. | | 709/206 |
| 2005/0159970 A1* | 7/2005 | Buyukkokten et al. | | 705/1 |
| 2006/0069732 A1* | 3/2006 | Shannon et al. | | 709/206 |
| 2006/0143068 A1* | 6/2006 | Calabria | | 705/10 |
| 2006/0242554 A1* | 10/2006 | Gerace et al. | | 715/501.1 |
| 2006/0282304 A1* | 12/2006 | Bedard et al. | | 705/10 |
| 2007/0043766 A1* | 2/2007 | Nicholas et al. | | 707/104.1 |
| 2007/0121843 A1* | 5/2007 | Atazky et al. | | 379/114.13 |
| 2007/0150603 A1* | 6/2007 | Crull et al. | | 709/227 |
| 2007/0161382 A1* | 7/2007 | Melinger et al. | | 455/456.1 |
| 2007/0218900 A1* | 9/2007 | Abhyanker | | 455/435.1 |
| 2007/0220092 A1* | 9/2007 | Heitzeberg et al. | | 709/204 |
| 2007/0250585 A1* | 10/2007 | Ly et al. | | 709/206 |
| 2008/0005064 A1* | 1/2008 | Sarukkai | | 707/3 |
| 2008/0177846 A1* | 7/2008 | Feng | | 709/206 |
| 2008/0235339 A1* | 9/2008 | Lurey et al. | | 709/206 |

OTHER PUBLICATIONS

YouTube Webpage,"Broadcast Yourself", p. 1, Aug. 26, 2006, http://web.archive.org/web/20050826165016/http://www.youtube.com.*

YouTube article,"BroadcastYourself", p. 5, para Jul. 27, 2005, Feb. 3, 2006, http://web.archive.org/web/20060203035046/youtube.com/blog.*

* cited by examiner

Login page

If you are already a member, please login here:

Email: [                    ]  Password: [                    ]  [Login]

If you are not a member, please register here:

Email:            [                    ]

Password:         [                    ]

Reenter password: [                    ]

[Register]

FIG. 2

Member's messages page

The following are your messages, Mr. Ram Venkat. Click on a message to see its description below:

| Author | Friend | Subject |
|---|---|---|
| David Hunyh | Pat Hurst | Global warming is real - Please tell your senator |
| Anonymous* | Bill Bush | Plight of caged animals |
| Jim Bellwether | Jim Bellwether | Membership in AARP |
| PBS Corp. | Advertisement** | Contribute to PBS |

* 'Anonymous' means that the author of the message did not wish to expose himself/herself
** 'Advertisement' means that the message is being promoted by the system.

Message description:

| Author: Anonymous | Forwarded by: Bill Bush | Subject: Plight of Caged animals |
|---|---|---|
| It is wrong to put animals in cages. Please do not support any business or organization that commits this cruel act. Please write to your legislators to stop any public zoo from doing this. Also, please boycott any circus that treats animals this way. This link Bad public zoos shows a web page that gives a list of all public zoos that cage animals. | | |

Following friends of yours have already acted on this message:

| Friend | Endorsed or Rejected | Endorsement or Rejection message |
|---|---|---|
| Peter Fernandez | Endorsed | I agree. This is a bad practice. |
| Bill Bush | Endorsed | This is definitely worth forwarding to you! |
| Rosy Holligan | Rejected | These animals are safer in cages than in forest. |

Click here if you endorse this message: [Yes, I endorse] Reason for endorsement:

Click here if you reject this message: [No, I reject] Reason for rejection:

To forward this message to your friends, select them from below and then click on: [Forward]

☐ Pat Hurst ☐ Dennis McCain ☐ Jim Bellwether ☐ Tom Moran ☐ Holly Patachi

FIG. 3

Message metrics

Message:

| Author: Anonymous* | Subject: Plight of Caged animals |
|---|---|
| It is wrong to put animals in cages. Please do not support any business or organization that commits this cruel act. Please write to your legislators to stop any public zoo from doing this. Also, please boycott any circus that treats animals this way. This link Bad public zoos shows a web page that gives a list of all public zoos that cage animals. ||

* The original author does not want to be exposed. Hence that information is not available for display here.

Reach metrics specify how much the message has spread:

- Number of people that have seen the message subject: 890
- Number of people that have read the message description: 800
- Number of people that have forwarded the message: 500

Acceptance metrics specify how much the message was accepted:

- Number of people that have endorsed the message: 600 (75% of people that read the message)
- Number of people that have rejected the message: 100 (12% of people that read the message)

Effectiveness metrics specify how much the message was successful in its intended action:

- Number of people that clicked on the link Bad public zoos: 200 (25% of people that read the message)

This message has no forms or attachments or embedded video or audio files.

FIG. 4

Message creation page

Subject: [          ]
Description:
[                    ]

To add a tracking link to the message, click here [ Add Link ]
To add an attachment to the message, click here [ Add attachment ]
To add a web form to the message, click here [ Add web form ]
To add a picture to the message, click here [ Add picture ]
To add special actions, select a template from the following list

[ Grassroots Advocacy
Fundraising
Membership drive
Event RSVP
GOTV Campaign
Survey/Poll
Product/Service purchase
Message promotion ]

and then click [ Add template ]

Message category: [ <Pick a category from the list> ]

Can the message be searched and found by other members: ☐

To forward this message to your friends, select them from below:

☐ Pat Hurst ☐ Dennis McCain ☐ Jim Bellwether ☐ Tom Moran ☐ Holly Patachi ☐ Bill Bush Once you are done with all the input above, click here [ Create Message ]

FIG. 5

SYSTEMS AND METHODS FOR SPREADING MESSAGES ONLINE

FIELD OF INVENTION

Traditionally, chain emails have been used to spread a message by asking each recipient to forward the message to one or more of his/her friends. This invention has following advantages over chain emails:

| Chain email | This invention |
| --- | --- |
| Replicates the message to each recipient | Renders one copy of the message |
| High overhead related to usage of network bandwidth, disk space and processing | Very limited use of network, storage and computing resources, just like a web page |
| Email servers restrict the size of an outgoing email, usually to a maximum of 5 Megs (including attachments) | There is no size restriction as messages are just like a web page |
| The same email can get forwarded back to the same person after recursively forwarded by friends | Prevents circular forwarding as the system knows which members have read a message |
| Does not have the ability to track the success of a message or get feedback | Measures the reach and acceptance of a message |
| Emails are intrusive as messages get pushed to the recipient | Non-intrusive as messages get pulled by the recipient by visiting a web site. |

This invention combines concepts from existing fields uniquely to create a software service. It solves the problem of spreading a message of common interest in an efficient and ethical way. The following table summarizes the concepts used and the fields of origin:

| Field | Concepts used |
| --- | --- |
| Social network | Members and connection between members defined as friends |
| Email | Privacy of user's friends, rules for forwarding |
| Chain email | Recursive forwarding of a message through friends |
| Online marketing | Record the action of users to create success metrics, Collaborative filtering |
| Search engines | Keyword searching, Category searching |

BRIEF DESCRIPTION OF THE DRAWINGS

FIG. 2 shows the opening web page in the system of FIG. 1 in which new users can register with the system or existing users can log in to the system.

FIG. 3 shows a web page in the system of FIG. 1, in which members can read messages and perform various actions on each message.

FIG. 4 shows a web page in the system of FIG. 1, in which members can see various metrics associated with the reach, acceptance and effectiveness of a message.

FIG. 5 shows a web page in the system of FIG. 1, in which members can create a new message in the system and recommend it to their friends.

DESCRIPTION OF THE PARTS OF THE INVENTION

Figure 1:
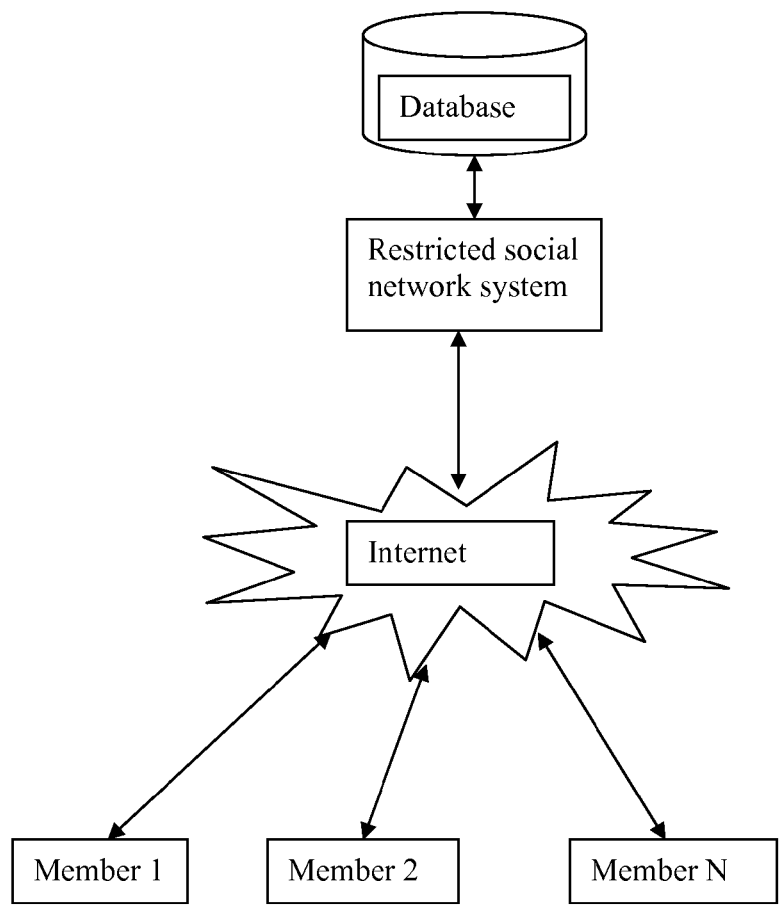
FIG. 1 shows a typical three-tier software implementation of the system in one embodiment of the present invention, when the system is implemented as a restricted social network. In this embodiment of the invention, recommending a message is referred to as "forwarding" in all the figures where it is used.

A private network of friends: The private network includes some of the features of a social network likes members and friends but it also bas system wide privacy restrictions. The system is restricted by not exposing a member's social connections to any other member. That is, a member can only see his/hers own friends and cannot see his/her friends' friends. Because of this restriction, members cannot contact/solicit a friend's friend in the system. These restrictions allow the system to model a grassroots social network without compromising on the privacy of its members and their connections.

The message, its creation and its properties: A member of the system can create a message and thereby become its author. A message is just like a web page and it can have links, forms, links to downloadable documents and embedded audio and video files. It can be in common internet formats like HTML, XHTML, DHTML and XML. Also, a message can have several parts including a title, summary and a description.

A message author can place the message into different categories. He can also specify keywords in the message. The system itself will create a search index on the message. These methods allow efficient searching of the message by other members using categories and keywords. It also allows the system to compare two messages for closeness of content and warn message authors of duplicate messages. A message author can mark a message as private, thus making it unsearchable by other members in the system.

Message recommending: Once a member creates a message in the system, he/she can ask the system to show the message to one or more of his/her friends in the social network. This act is called recommending the message. All those friends would then be able to view the message when they subsequently connect to the system. If those friends are already connected to the system might automatically refresh their screen and show the new message. The system does not lose the context of the message as it gets recommended. The system maintains an unique identifier to a single copy of the message and it serves that same copy every time a member requests for the message.

Member actions on a message: A member that sees a message is called a viewer of the message.

A viewer can take one or more of the following actions on each message he views:
 (1) Endorse the message content.
 (2) Add a reason for endorsement.
 (3) Reject the message content.
 (4) Add a reason for rejection.
 (5) Recommend the message to one or more of viewer's friends in the network.
 (6) Click on one or more of links in the message.
 (7) Open an attached document to the message by clicking on a link to a document.
 (8) View a video file in the message.
 (9) Listen to an audio file in the message.
 (10) Fill up one or more forms embedded in the message and submit them.
 (11) Load a java applet or ActiveX control embedded in the message.

Success metrics of the message: The system records each above action of a message viewer on a message. For video and audio files, the system maintains how long the viewer watched or listened to the content. Based on these data, the system calculated the metrics related to the overall success of a message. Some of the possible message metrics are number of members (and percentage of total members that this message was recommended to ) that have (1) Seen the message subject
(2) Seen the message description
(3) Endorsed the message
(4) Rejected the message
(5) Recommended the message
(6) Clicked on each link in the message
(7) Submitted each form (metrics related to each form field value and combinations of values) in the message
(8) Opened an attached document to the message by clicking on a link
(9) Viewed a video file in the message and how long
(10) Listened to an audio file in the message and how long Message promotion: A message author can ask the system to promote the message to other members that are not directly connected to her.

The system also uses collaborative filtering technique to show other messages to a message viewer. This technique looks at a subset of messages that a viewer acted on, then selects other members that acted on all the same messages the same way. Among the selected members, the system picks other messages that they acted on. It then shows these messages to the message viewer.

A message author can submit the message and the keywords in the message to one or more internet search engines like Google and Yahoo, so that, internet users searching on those keywords would find the message in this social network. The author can also ask the system to place advertisements for the message in other internet websites.

Soliciting messages with additional system functionality: A message author can use enhanced messages to solicit message viewers to conduct an online transaction or send an online communication by submitting a web form embedded in the message, These enhanced messages are defined by the system using message templates and it will include web form fields that are necessary to conduct a particular transaction or send a certain communication. The author and viewers of the message can recommend these soliciting messages just liked other messages. When a member views this message, one or more fields in the form might get filled automatically from the viewer's profile in the system. When the viewer submits the form to the system. the system will conduct an online transaction or send an online communication depending on the message template.

Some such soliciting messages are:

| Message template | Form fields | System Action |
| --- | --- | --- |
| Grassroots advocacy | Name, Home address, email | A communication is sent on the member's behalf to one or more legislators or public officials that represent that member. The system automatically finds the legislator that represents that member using his home address and postal zip code. |
| Fundraising | Name, Address, Credit card | A donation is made to an organization on behalf of the member. |
| Membership drive (for other organizations) | Name, Address, Credit card, interests | A membership application gets submitted to an organization on the viewer's behalf and the membership dues are taken from the credit card |
| GOTV campaign | Name, Address, Social security number | An application is sent on the member's behalf to register to vote in an election. |
| Event RSVP | Name, Address, Phone number, credit card | An RSVP is sent on behalf of the member to the event organizer. If there is an attendance fee, it is taken from the credit card |
| Surveys & Polls | Name, Address, List of questions | Member's answers are added to the survey/poll results maintained on a server. |
| Promoting the message itself | Name, Credit card | A monetary contribution is made to promote the message the member is viewing to other members in the social network or internet users. |
| Product/Service purchase | Name, Shipping address, quantity, credit card | An order is placed with an online store for a product or a service using the member's credit card. |

Grassroots advocacy example: An author creates a message using the Grassroots Advocacy template which solicits the message viewer to email his legislators. The template provides placeholders for the author to fill up the message title, a description and the body of the email that would be sent to the legislator. The author used these fields to write about Global warming and he recommends the message to some of his friends who recommend it to others. When the message viewers click on the submit button in this message, the system uses the viewer's name and home address to match him to his legislator and emails a letter to the legislator on his behalf.

Fundraising example: An author creates a message using the Fundraising template that solicits message viewers to contribute money to an organization. The author used the placeholder fields to write about The Ted Cross organization and the suggested contribution amounts and recommends it to her friends. Message viewers can use a drop down box in the message to select one of several contribution amounts that the author picked and enter their credit cared information,. when a viewer submits this form, the system uses the viewer's credit card information and the dollar amount she chose to make a contribution to the Red Cross organization on the viewer's behalf.

Product/Service purchase example: An author uses the online transaction template to crate a message. The template will provide a placeholder for the product or service and a placeholder for the online store that will fulfill that request. The author will choose his product or service from those lists and recommend the message to his friends. The viewers of this message can use a textbox to fill a quantity of the product that they want to purchase and also credit card information. When the message viewer submits the form, the system will use the member's credit card to place an order for the product with the online store on the viewer's behalf.

What is claimed is:

1. A method for spreading an online message comprising:
   (i) receiving an original message from a member of an online system and assigning a unique identifier to the message;

(ii) receiving a request from the member to display the original message on one or more pages of the online system, each page associated with a registered friend of the member;

(iii) displaying the original message on one of the pages while maintaining the same identifier for the displayed message;

(iv) receiving a request from a registered friend of the member ("member's friend"), associated with the page where the message was displayed, to display the original message on one or more additional pages of the online system, each additional page associated with a registered friend of the member's friend; and (v) displaying the original message on one of the additional pages while maintaining the same identifier for the displayed message.

2. The method as set forth in claim 1 further comprising recording actions taken by each member and registered friend related to the displayed message.

3. The method as set forth in claim 1 wherein said message comprises a title, summary and description.

4. The method as set forth in claim 1 wherein said message consists of content selected from one or more of embedded hyperlinks, web forms, audio files, video files, downloadable documents, hidden frames, JavaScript, Java applets and ActiveX controls.

5. The method as set forth in claim 1 wherein said message is formatted in a format selected from one of plain text, HTML, DHTML, XML, XHTML, and PDF.

6. The method as set forth in claim 1 further comprising recording keywords in the original message.

7. The method as set forth in claim 1 further comprising categorizing the original message.

8. The method as in claim 1 further comprising displaying similar messages to said original message using categories and keywords on the page or and/or additional page.

9. The method as in claim 1 further comprising finding other messages that may be of interest to a member using collaborative filtering.

10. The method as in claim 1 further comprising receiving a message from the registered friend endorsing or rejecting the original message.

11. The method as in claim 1 further comprising displaying the original message on one or more pages of certain friends of the member without receiving a request from the member.

12. The method as in claim 1 further comprising displaying cumulative metrics on actions of members selected from the group consisting of viewing, endorsing, rejecting and displaying the original message.

13. The method as in claim 1 further comprising displaying cumulative metrics on actions of members on each link that is embedded in the original message.

14. The method as in claim 1 further comprising displaying cumulative metrics on web form values for each embedded web form in the original message.

15. The method as in claim 1 further comprising displaying cumulative metrics on actions of members on each downloadable document in the original message.

16. The method as in claim 1 further comprising displaying cumulative metrics on the amount of time members played each audio or video file embedded in the original message.

17. The method as in claim 1 further comprising displaying a message to a member as a promotion for the original message.

18. The method as in claim 1 further comprising generating a message for inclusion in internet search engines.

19. The method as in claim 1 further comprising placing advertisements for a message in external websites.

20. The method as in claim 1 further comprising fulfilling an online transaction when a message viewer submits a web form in a message.

21. The method as in claim 1 further comprising sending an online communication when a message viewer submits a web form in a message.

22. The method as in claim 1 further comprising:

(vi) receiving a further request to further display the original message on a page of another member of the online system, and (vii) further displaying the original message on the page associated with the other member, wherein each further request is received from a registered member whose associated page displays the original message.

23. The method as in claim 1 further comprising receiving a message from the registered friend explaining the endorsement or rejection.

24. The method as in claim 1 wherein displaying the original message in steps (iii), (iv) and (v) comprises displaying a same, original message.

25. A system comprising one or more server computers for spreading an online message, wherein each server computer comprises:

(i) a reception section for receiving an original message from another member of the system and assigning a unique identifier to the message, and receiving a request from the member to display the original message as one or more pages of the system, each page associated with a registered friend of the member;

(ii) a control section for controlling the display of the original message on one of the pages while maintaining the same identifier for the displayed message;

(iii) the reception section further receiving a request from a registered friend of the member ("member's friend"), associated with the page where the message was displayed, to display the original message on one or more additional pages of the system, each additional page associated with a registered friend of the member's friend; and (iv) the control section further controlling the display of the original message on one of the additional pages while maintaining the same identifier for the displayed message.

26. The system as set forth in claim 25 wherein the control section further controls the display of the original message on one or more pages of certain friends of the member without receiving a request from the member.

27. The system as set forth in claim 25, wherein each server computer further comprises a computation section for computing cumulative metrics on actions of members selected from the group consisting of including viewing, endorsing, rejecting and displaying the original message.

28. The system as set forth in claim 25, wherein each server computer further comprises a computation section for computing cumulative metrics on actions of members on each link that is embedded in the original message.

29. The system as set forth in claim 25, wherein each server computer further comprises a computation section for computing cumulative metrics on web form values for each embedded web form in the original message.

30. The system as set forth in claim 25, wherein each server computer further comprises a computation section for computing cumulative metrics on actions of members on each downloadable document in the original message.

31. The system as set forth in claim 25, wherein each server computer further comprises a computation section for computing cumulative metrics on the amount of time members played each audio or video file embedded in the original message.

32. The system as in claim 25 wherein the control sections in parts (ii) and (iv) further control the display of a same, original message.

* * * * *